(12) United States Patent
Kerstetter, III

(10) Patent No.: US 8,557,906 B2
(45) Date of Patent: Oct. 15, 2013

US008557906B2

(54) FLAME RESISTANT POLYOLEFIN COMPOSITIONS AND METHODS FOR MAKING THE SAME

(75) Inventor: Randal Howard Kerstetter, III, Wadsworth, OH (US)

(73) Assignee: ExxonMobil Chemical Patents Inc., Houston, TX (US)

(*) Notice: Subject to any disclaimer, the term of this patent is extended or adjusted under 35 U.S.C. 154(b) by 62 days.

(21) Appl. No.: 13/116,868

(22) Filed: May 26, 2011

(65) Prior Publication Data

US 2012/0059104 A1 Mar. 8, 2012

Related U.S. Application Data

(60) Provisional application No. 61/380,006, filed on Sep. 3, 2010.

(51) Int. Cl.
| C08K 3/22 | (2006.01) |
| C08K 5/00 | (2006.01) |
| C08K 5/34 | (2006.01) |
| C08K 3/38 | (2006.01) |
| C08K 3/00 | (2006.01) |
| C08K 3/16 | (2006.01) |
| C08K 3/32 | (2006.01) |
| C08K 3/08 | (2006.01) |
| C09K 21/00 | (2006.01) |
| D21H 19/58 | (2006.01) |

(52) U.S. Cl.
USPC ........... 524/430; 252/609; 524/87; 524/89; 524/467; 524/469; 524/411; 524/412; 524/52; 524/100; 524/405; 524/416; 524/436

(58) Field of Classification Search
USPC .......................................................... 524/430
See application file for complete search history.

(56) References Cited

U.S. PATENT DOCUMENTS

| 2,972,600 A | 2/1961 | Braidwood |
| 3,248,179 A | 4/1966 | Norwood |
| 3,287,440 A | 11/1966 | Giller |
| 4,130,535 A * | 12/1978 | Coran et al. ........... 524/487 |
| 4,311,628 A | 1/1982 | Abdou-Sabet et al. |
| 4,387,176 A | 6/1983 | Frye |
| 4,540,753 A | 9/1985 | Cozewith et al. |
| 4,543,399 A | 9/1985 | Jenkins, III et al. |
| 4,588,790 A | 5/1986 | Jenkins, III et al. |
| 4,594,390 A | 6/1986 | Abdou-Sabet et al. |
| 4,613,484 A | 9/1986 | Ayres et al. |
| 5,001,205 A | 3/1991 | Hoel |
| 5,028,670 A | 7/1991 | Chinh et al. |
| 5,100,947 A | 3/1992 | Puydak et al. |
| 5,157,081 A | 10/1992 | Puydak et al. |
| 5,198,401 A | 3/1993 | Turner et al. |
| 5,290,866 A | 3/1994 | Dobreski et al. |
| 5,317,036 A | 5/1994 | Brady, III et al. |
| 5,352,749 A | 10/1994 | DeChellis et al. |
| 5,391,629 A | 2/1995 | Turner et al. |
| 5,397,832 A | 3/1995 | Ellul |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,627,242 A | 5/1997 | Jacobsen et al. |
| 5,656,693 A | 8/1997 | Ellul et al. |
| 5,665,818 A | 9/1997 | Tilston et al. |
| 5,668,228 A | 9/1997 | Chinh et al. |
| 5,677,375 A | 10/1997 | Rifi et al. |
| 5,693,727 A | 12/1997 | Goode et al. |
| 5,712,352 A | 1/1998 | Brant et al. |
| 5,936,028 A | 8/1999 | Medsker et al. |
| 5,952,425 A | 9/1999 | Medsker et al. |
| 6,042,260 A | 3/2000 | Heidemeyer et al. |
| 6,147,160 A | 11/2000 | Wang et al. |
| 6,410,137 B1 * | 6/2002 | Bunyan ................. 428/356 |
| 6,437,030 B1 | 8/2002 | Coran et al. |
| 6,451,915 B1 | 9/2002 | Ellul et al. |
| 6,867,260 B2 | 3/2005 | Datta et al. |
| 6,881,800 B2 | 4/2005 | Friedersdorf |
| 6,992,158 B2 * | 1/2006 | Datta et al. ........... 526/348 |
| 7,232,871 B2 | 6/2007 | Datta et al. |
| 2002/0169240 A1 | 11/2002 | Bar-Yakov et al. |
| 2005/0075442 A1 * | 4/2005 | Titelman et al. ........... 524/495 |

(Continued)

FOREIGN PATENT DOCUMENTS

| EP | 0634421 | 1/1995 |
| EP | 0794200 | 9/1997 |

(Continued)

OTHER PUBLICATIONS

JP 2000-265011 A (2000), machine translation, JPO Advanced Industrial Property Network (AIPN).*
Wypych, George. Handbook of Fillers—A Definitive User's Guide and Databook, 2nd Ed.. (pp. 171). ChemTec Publishing (2000).*
Wypych, George. Handbook of Fillers—A Definitive User's Guide and Databook, 2nd Ed. (pp. 171). ChemTech Publishing (2000).*
JP 2005-153225 A (2005), machine translation, JPO Advanced Industrial Property Network (AIPN).*
Chen, X. S. et al., "Synergistic effect of decobromodiphenyl ethane and montmorillonite on flame retardancy of polypropylene", Polymer Degradation and Stability, Barking, GB, vol. 94, No. 9, Sep. 1, 2009, pp. 1520-1525 (XP026322811).
Ellul et al., "Crosslink Densities and Phase Morphologies in Dynamically Vulcanized TPEs," Rubber Chemistry and Technology, vol. 68, pp. 573-584 (1995).

(Continued)

Primary Examiner — David W Wu
Assistant Examiner — Josephine Chang
(74) Attorney, Agent, or Firm — Renuka N. Ganesh

(57) ABSTRACT

A flame-retardant composition having (a) a copolymer comprising at least about 50 wt. % of propylene-derived units, and about 5-35 wt. % of units derived from at least one of ethylene or a $C_{4-10}$ alpha-olefin, wherein the copolymer has a heat of fusion of about 75 J/g or less; and (b) a flame retardant, wherein the composition satisfies the requirements of UL94 with a V2 rating.

17 Claims, No Drawings

(56) References Cited

U.S. PATENT DOCUMENTS

| | | | |
|---|---|---|---|
| 2005/0107530 A1* | 5/2005 | Datta et al. ............... 525/70 |
| 2006/0269771 A1 | 11/2006 | Cogen et al. |
| 2007/0015877 A1 | 1/2007 | Burkhardt et al. |
| 2008/0073627 A1* | 3/2008 | Goode et al. ............... 252/607 |
| 2009/0247656 A1 | 10/2009 | Jacob et al. |
| 2010/0113694 A1 | 5/2010 | Nadella et al. |
| 2010/0120953 A1 | 5/2010 | Aarts et al. |
| 2010/0190896 A1* | 7/2010 | Kotian et al. ............... 524/81 |
| 2012/0059105 A1* | 3/2012 | Kerstetter et al. ............ 524/412 |

FOREIGN PATENT DOCUMENTS

| | | | |
|---|---|---|---|
| EP | 0802202 | | 10/1997 |
| JP | 2000265011 A | * | 9/2000 |
| JP | 2005153225 A | * | 6/2005 |
| WO | WO 96/08520 | | 3/1996 |
| WO | WO 96/33227 | | 10/1996 |
| WO | WO 97/22639 | | 6/1997 |
| WO | WO 00/01745 | | 1/2000 |
| WO | WO 02/36651 | | 5/2002 |
| WO | WO 03/046071 | | 6/2003 |
| WO | WO 2004/009327 | | 1/2004 |
| WO | WO 2008/076264 | | 6/2008 |
| WO | WO 2009/032622 | | 3/2009 |
| WO | WO 2009/153786 | | 12/2009 |
| WO | WO 2011/046545 | | 4/2011 |

OTHER PUBLICATIONS

Ver Strate et al., "Near Monodisperse Ethylene-Propylene Copolymers by Direct Ziegler-Natta Polymerization. Preparation, Characterization, Properties," Macromolecules, 1988, vol. 21, pp. 3360-3371.

UL 94, Standard for Safety, *"Tests for Flammability of Plastic Materials for Parts in Devices and Appliances,"* Jun 4, 2009, Underwriters Laboratories Inc.

* cited by examiner

FLAME RESISTANT POLYOLEFIN COMPOSITIONS AND METHODS FOR MAKING THE SAME

CROSS-REFERENCE TO RELATED APPLICATION

This application claims priority to and the benefit of U.S. Ser. No. 61/380,006, filed Sep. 3, 2010, the contents of which is incorporated herein by reference.

FIELD OF THE INVENTION

Embodiments of the present invention are directed toward polyolefin compositions that exhibit desirable flame resistance and methods for making them.

BACKGROUND OF THE INVENTION

Polyolefins are widely used as plastics and demonstrate superior moldability, solvent resistance and mechanical strength, possess a low specific gravity, and are inexpensive as materials in the fields of automobile parts, electric/electronic parts, electric products for domestic use, blown and cast film, molded goods, calendered and extruded profiles, and the like.

Polyolefins have been modified with various additives. For example, inert fillers, such as clays, have been added to facilitate manufacture and add economic value to the compositions. And, carbon black has been added as a colorant or as a UV protectant. In some applications it is desirable that the polyolefins are flame resistant. Accordingly, flame retardants may be added to the polyolefin to render the polyolefins flame resistant. Commonly used flame retardants include inorganic flame retardant such as magnesium hydroxide or aluminum hydroxide, halogenated flame retardants such as decabromodiphenyl ether, non-halogenated flame retardants such as ammonium carbamylpolyphosphate, or a flame retardant filler package which may be a combination of any of the above.

While polyolefins have proven to be versatile by accommodating various additives that can enhance the manufacture, processability, and/or ultimate utility of the compositions, the addition of additives can have an adverse impact on the resultant polyolefin composition. For example, polyolefins generally have limits on the level of filler materials or other particulates that can be incorporated into the composition without negatively impacting one or more characteristics of the manufacture, processability, or mechanical properties of the polyolefin composition. For example, it has been observed that polyolefin compositions that include large amounts of flame retardants have a tendency to bloom or bleed out, which is a phenomenon where small amounts of flame retardant migrate to the surface of the composition and deposit on fabrication equipment such as molds. Similarly, reduction in melt viscosity, crystallinity, decreased tensile strength and modulus, or decreased elongation and impact strength may be observed with the addition of a flame retardant package.

Accordingly, there is a need for flame retardant polyolefin compositions that have good flame resistance, good UV properties, and maintained or improved mechanical properties.

SUMMARY OF THE INVENTION

One or more embodiments of the present invention include a flame-retardant composition comprising (a) a copolymer comprising at least about 50 wt. % of propylene-derived units, and about 5-35 wt. % of units derived from at least one of ethylene or a $C_{4-10}$ alpha-olefin, wherein the copolymer has a heat of fusion of about 75 J/g or less; and (b) a flame retardant, wherein the composition satisfies the requirements of UL94 with a V2 rating.

One or more embodiments of the present invention further include a method for making a flame-retardant composition, comprising combining (a) a copolymer comprising at least about 50 wt. % of propylene-derived units, and about 5-35 wt. % of units derived from at least one of ethylene or a $C_{4-10}$ alpha-olefin, wherein the copolymer has a heat of fusion of about 75 J/g or less; and (b) a flame retardant; and (c) and forming a flame-retardant composition that satisfies the requirements of UL94, with a V2 rating.

DETAILED DESCRIPTION OF ILLUSTRATIVE EMBODIMENTS

Introduction

Embodiments of the invention are based, at least in part, on the discovery of a polyolefin composition having flame resistance, weatherability, and maintained or improved mechanical properties. In particular, it has been discovered that polyolefins can be modified with both flame retardants and sufficient carbon black to provide polyolefin compositions that are advantageously capable of meeting the flame-resistance standards of UL94V2 and the ultraviolet light (UV) standards of UL746CF1. It has been surprisingly discovered that these polyolefin compositions can exhibit desirable mechanical properties despite the presence of the flame retardants and the carbon black. As a result, these polyolefin compositions can be used in high temperature, outdoor applications such as for seals, gaskets, and hoses for outdoor lighting and electrical applications including those devices that capture and convert solar energy.

Polyolefin Compositions

The polyolefin compositions of the present invention include a propylene-based polyolefin, in particular, a propylene-alpha olefin copolymer, a sufficient amount of carbon black to provide UV resistance to the polyolefin composition, and a sufficient amount of flame retardant material to provide flame resistance to the polyolefin composition. Additionally, the polyolefin compositions of the present invention may include a synergist, a char former, and a UV protectant. The polyolefins may also include other constituents that may be employed in the art of making flame resistant polyolefin compositions.

As used herein, "wt. %" means weight percent.

Embodiments herein relate to a flame-retardant composition comprising:

(a) a copolymer comprising at least about 50 wt. % of propylene-derived units, and about 5-35 wt. % of units derived from at least one of ethylene or a $C_{4-10}$ alpha-olefin (preferably about 7 to about 32 wt. %, about 8 to about 25 wt. %, about 8 to about 20 wt. %, or about 8 to about 18 wt. %; preferably about 10-20 wt. % of ethylene-derived units);

wherein the copolymer has a heat of fusion of about 75 J/g or less (preferably about 70 J/g or less, about 50 J/g or less, or about 35 J/g or less);

(b) a flame retardant preferably comprising at least one of:

(i) a halogenated hydrocarbon (preferably the halogenated hydrocarbon is one of chlorinated paraffins, chlorinated polyolefins, perchlorocyclopentadecane, hexabromobenzene, n-ethylene-bisdibromonorbornane-dicarboxylmide, ethylene-bistetrabromophthalimide, tetrabromobisphenol-A derivatives, tetrabromobisphenol S, tetrabromodipentaerythritol, brominated cyclopentadiene, and decabromodiphenylethane; preferably the halogenated hydrocarbon is a brominated hydrocarbon; preferably the brominated hydrocarbon is decabromodiphenylethane);

(ii) a metal oxide (preferably the metal oxide is one of antimony trioxide, antimony oxide sols and salts of Sb(v) esters; preferably the metal oxide is antimony oxide);

(iii) optionally a char forming material (preferably zinc borate hydrate, magnesium hydroxide, aluminum trihydrate, ammonium polyphosphate, melamine polyphosphate, starch or other carbohydrates, and polyhydric alcohols; preferably zinc borate hydrate);

preferably the flame retardant comprises decabromodiphenylethane, antimony trioxide, and zinc borate; and (c) optionally, a UV protectant (preferably the UV protectant is carbon black, preferably the composition is substantially devoid of UV stabilizer and antioxidants other than carbon black; preferably in an amount of at least 1.5 wt. %, in other embodiments at least 2.0 wt. %, and in other embodiments at least 3.0 wt. % UV protectant based upon the entire weight of the composition);

wherein the composition satisfies the requirements of UL94 with a V2 rating (preferably with a V1 rating, preferably with a V0 rating). References to requirements of UL94 with a V0, V1, or V2 rating, as used herein, means that the referenced material meets the requirements of the UL 94 Vertical Burning Test (V0, V1 or V2), a standard known in industry and available from Underwriters Laboratories Inc., "Tests for Flammability of Plastic Materials for Parts in Devices and Appliances," Jun. 4, 2009.

Each of the copolymer, the flame retardant (and its components), and the UV protectant will be discussed, in turn, below.

Polyolefins

The polyolefins useful herein are propylene-alpha-olefin copolymers, in particular copolymers of propylene-derived units and units derived from at least one of ethylene or a $C_{4-10}$ alpha-olefin. The copolymer contains at least about 50% propylene-derived units by weight of the propylene-alpha-olefin copolymer. In an embodiment, the propylene-alpha-olefin copolymer is a propylene-based elastomer having limited crystallinity due to adjacent isotactic propylene units and a melting point as described herein. The crystallinity and the melting point of the propylene-alpha-olefin copolymer are reduced compared to highly isotactic polypropylene by the introduction of errors in the insertion of propylene. The propylene-alpha-olefin copolymer is generally devoid of any substantial intermolecular heterogeneity in tacticity and comonomer composition, and also generally devoid of any substantial heterogeneity in intramolecular composition distribution.

The units, or comonomers, derived from at least one of ethylene or a $C_{4-10}$ alpha-olefin may be present in an amount of about 1 to about 35%, or about 5 to about 35%, preferably about 7 to about 32%, more preferably about 8 to about 25%, even more preferably about 8 to about 20%, and most preferably about 8 to about 18% by weight of the propylene-alpha-olefin copolymer. The comonomer content may be adjusted so that the propylene-alpha-olefin copolymer has a heat of fusion of about 75 J/g or less, melting point of about 100° C. or less, and crystallinity of about 2% to about 65% of isotactic polypropylene, and preferably a melt flow rate (MFR) of about 0.5 to about 90 dg/min (ASTM D1238, 230° C./2.16 kg).

The propylene-alpha-olefin copolymer may comprise more than one comonomer. Preferred embodiments of a propylene-alpha-olefin copolymer having more than one comonomer include propylene-ethylene-octene, propylene-ethylene-hexene, and propylene-ethylene-butene polymers.

In some embodiments where more than one comonomer derived from at least one of ethylene or a $C_{4-10}$ alpha-olefin is present, the amount of one comonomer may be less than about 5% by weight of the propylene-alpha-olefin copolymer, but the combined amount of comonomers by weight of the propylene-alpha-olefin copolymer is about 5% or greater.

In a preferred embodiment, the comonomer is ethylene, 1-hexene, or 1-octene, and preferably in an amount of about 5 to about 25%, about 5 to about 20%, about 5 to about 16%, about 6 to about 18%, or in some embodiments about 8 to about 20% by weight of the propylene-alpha-olefin copolymer.

In one embodiment, the propylene-alpha-olefin copolymer comprises ethylene-derived units. The propylene-alpha-olefin copolymer may comprise about 5 to about 35%, preferably about 5 to about 20%, about 10 to about 20%, about 15 to about 20%, or about 10 to about 12% of ethylene-derived units by weight of the propylene-alpha-olefin copolymer. In some embodiments, the propylene-alpha-olefin copolymer consists essentially of units derived from propylene and ethylene, i.e., the propylene-alpha-olefin copolymer does not contain any other comonomer in an amount other than typically present as impurities in the ethylene and/or propylene feedstreams used during polymerization or an amount that would materially affect the heat of fusion, melting point, crystallinity, or melt flow rate of the propylene-alpha-olefin copolymer, or any other comonomer intentionally added to the polymerization process.

The propylene-alpha-olefin copolymer may have a triad tacticity of three propylene units, as measured by $^{13}C$ NMR, of at least about 75%, at least about 80%, at least about 82%, at least about 85%, or at least about 90%. Preferably, the propylene-alpha-olefin copolymer has a triad tacticity of about 50 to about 99%, about 60 to about 99%, more preferably about 75 to about 99% or about 80 to about 99%. In some embodiments, the propylene-alpha-olefin copolymer may have a triad tacticity of about 60 to 97%.

The propylene-alpha-olefin copolymer has a heat of fusion ("$H_f$"), as determined by the Differential Scanning calorimetry ("DSC"), of about 75 J/g or less, preferably about 70 J/g or less, about 50 J/g or less, or about 35 J/g or less. The propylene-alpha-olefin copolymer may have a lower limit $H_f$ of about 0.5 J/g, about 1 J/g, or about 5 J/g. For example, the $H_f$ value may be anywhere from 1.0, 1.5, 3.0, 4.0, 6.0, or 7.0 J/g, to 30, 35, 40, 50, 60, 70, or 75 J/g.

The propylene-alpha-olefin copolymer may have a percent crystallinity, as determined according to the DSC procedure described herein, of about 2% to about 65%, preferably about 0.5 to about 40%, preferably about 1 to about 30%, and more preferably about 5 to about 35%, of isotactic polypropylene. The thermal energy for the highest order of propylene (i.e., 100% crystallinity) is estimated at 189 J/g. In some embodiments, the copolymer has a crystallinity less than 40%, in the range of about 0.25 to about 25%, or about 0.5 to about 22% of isotactic polypropylene. Embodiments of the propylene-alpha-olefin copolymer may have a tacticity index m/r from a lower limit of about 4 or about 6 to an upper limit of about 8 or about 10 or about 12. In some embodiments, the propylene-alpha-olefin copolymer has an isotacticity index greater than 0%, or within the range having an upper limit of about 50% or about 25%, and a lower limit of about 3% or about 10%.

In some embodiments, crystallinity of the propylene-alpha-olefin copolymer is reduced by copolymerization of propylene with limited amounts of one or more comonomers selected from: ethylene, $C_{4-20}$ alpha-olefins, and polyenes. In these copolymers, the amount of propylene-derived units present in the propylene-alpha-olefin copolymer ranges from an upper limit of about 99.9%, about 97%, about 95%, about 94%, about 92%, about 90%, or about 85%, to a lower limit of about 60%, about 68%, about 70%, about 71%, about 75%, about 76%, or about 80%, based on the total weight of the propylene-alpha-olefin copolymer.

The optional polyene may be any hydrocarbon structure having at least two unsaturated bonds wherein at least one of the unsaturated bonds is readily incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of optional polyene-derived units present in the propylene-alpha-olefin copolymer ranges from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, or about 1%, based on the total weight of the propylene-alpha-olefin copolymer. In a preferred embodiment, the propylene-alpha-olefin copolymer comprises diene-derived units (as used herein, "diene"). In some embodiments, the diene is present in an amount of about 10% or less, preferably about 5% or less, and more preferably about 3% or less by weight of the propylene-alpha-olefin copolymer. In some embodiments, the diene is present in an amount of about 0.1 to about 6%, about 0.1 to about 5%, preferably about 0.1 to about 4%, more preferably about 0.1 to about 2%, and most preferably about 0.1 to about 1% by weight of the propylene-alpha-olefin copolymer.

The propylene-alpha-olefin copolymer may have a single peak melting transition as determined by DSC. In one embodiment, the copolymer has a primary peak transition of about 90° C. or less, with a broad end-of-melt transition of about 110° C. or greater. The peak "melting point" ("Tm") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-alpha-olefin copolymer. The propylene-alpha-olefin copolymer may have a Tm of about 100° C. or less, about 90° C. or less, about 80° C. or less, or about 70° C. or less. In one embodiment, the propylene-alpha-olefin copolymer has a Tm of about 25 to about 100° C., preferably about 25 to about 85° C., about 25 to about 75° C., or about 25 to about 65° C. In some embodiments, the propylene-alpha-olefin copolymer has a Tm of about 30 to about 80° C., preferably about 30 to 70° C.

The propylene-alpha-olefin copolymer may have a density of about 0.850 to about 0.920 g/cm$^3$, about 0.860 to about 0.900 g/cm$^3$, preferably about 0.860 to about 0.890 g/cm$^3$, at room temperature as measured per ASTM D-1505.

The propylene-alpha-olefin copolymer may have a melt flow rate ("MFR"), as measured per ASTM D 1238, 2.16 kg at 230° C., of at least about 0.2 dg/min. In one embodiment, the propylene-alpha-olefin copolymer MFR from about 0.5 to about 5000 dg/min, about 1 to about 2500 dg/min, about 1.5 to about 1500 dg/min, about 2 to about 1000 dg/min, about 5 to about 500 dg/min, about 10 to about 250 dg/min, about 10 to about 100 dg/min, about 2 to about 40 dg/min, or about 2 to about 30 dg/min. In some preferred embodiments, the propylene-alpha-olefin copolymer MFR is about 0.5 to about 50 dg/min, about 1 to about 30 dg/min, or about 2 to about 10 dg/min.

The propylene-alpha-olefin copolymer may have an Elongation at Break of less than about 2000%, less than about 1000%, or less than about 800%, as measured per ASTM D 412.

The propylene-alpha-olefin copolymer may have a weight average molecular weight (Mw) of about 5,000 to about 5,000,000 g/mole, preferably about 10,000 to about 1,000,000 g/mole, and more preferably about 50,000 to about 400,000 g/mole; a number average molecular weight (Mn) of about 2,500 to about 2,500,00 g/mole, preferably about 10,000 to about 250,000 g/mole, and more preferably about 25,000 to about 200,000 g/mole; and/or a z-average molecular weight (Mz) of about 10,000 to about 7,000,000 g/mole, preferably about 80,000 to about 700,000 g/mole, and more preferably about 100,000 to about 500,000 g/mole. The propylene-alpha-olefin copolymer may have a molecular weight distribution ("MWD") of about 1.5 to about 20, or about 1.5 to about 15, preferably about 1.5 to about 5, and more preferably about 1.8 to about 5, and most preferably about 1.8 to about 3 or about 4.

In some embodiments, the copolymer has one or more of:
(i) a melting point of about 100° C. or less (preferably about 90° C. or less, about 80° C. or less, or about 70° C. or less);
(ii) a crystallinity of about 2% to about 65% of isotactic polypropylene (preferably about 0.5 to about 40%, about 1 to about 30%, or about 5 to about 35%);
(iii) a triad tacticity of three propylene units, as measured by $^{13}$C NMR, of at least about 75% (at least about 80%, at least about 82%, at least about 85%, or at least about 90%); and
(iv) a Melt Flow Rate of from about 0.5 to about 5000 dg/min (preferably about 1 to about 2500 dg/min, about 1.5 to about 1500 dg/min, about 2 to about 1000 dg/min, about 5 to about 500 dg/min, about 10 to about 250 dg/min, about 10 to about 100 dg/min, about 2 to about 40 dg/min, or about 2 to about 30 dg/min).

Preferred propylene-alpha-olefin copolymers are available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-alpha-olefin copolymer suitable for use in the invention can be readily determined using methods commonly known in the art.

The composition of the invention, e.g., a masterbatch, may include one or more different propylene-alpha-olefin copolymers, i.e., propylene-alpha-olefin copolymers each having one or more different properties such as, for example, different comonomer or comonomer content. Such combinations of various propylene-alpha-olefin copolymers are all within the scope of the invention.

In one embodiment, the propylene-alpha-olefin copolymer is an elastomer including propylene-derived units, diene-derived units, and ethylene-derived units, and having isotactic polypropylene crystallinity, a melting point by DSC equal to or less than 110° C., and a heat of fusion of from about 5 J/g to about 50 J/g. The propylene-derived units are present in an amount of about 80 to about 90%, based on the combined weight of units derived from propylene, diene, and ethylene. The diene-derived units are present in an amount of about 0.3 to about 3%, based on the combined weight of units derived from propylene, diene, and ethylene. The ethylene-derived units are present in an amount of about 10 to about 20%, based on the combined weight of units derived from propylene, diene, and ethylene.

Embodiments of the invention include a semicrystalline propylene-based polymer having isotactic polypropylene crystallinity and optionally including a diene. Embodiments of the invention also include crosslinkable and crosslinked, semicrystalline, propylene-based polymers and blends including such polymers.

In one embodiment, elastomeric properties of the propylene-alpha-olefin copolymer are improved by curing the propylene-alpha-olefin copolymer to various degrees. In another embodiment, the propylene-alpha-olefin copolymer is cured to various degrees to permit convenient processing. In some embodiments, the propylene-alpha-olefin copolymer includes a diene to facilitate curing and optimal end use performance in various options of formulation and processing. In other embodiments, such as when using radiation to induce the crosslinking reaction, the presence of diene in the propylene-alpha-olefin copolymer is optional. Crosslinked propylene-alpha-olefin copolymers, their properties and method of manufacturing are described in, for example U.S. Publication No. 2005/107530, the contents of which are incorporated herein by reference.

In various embodiments, the propylene-alpha-olefin copolymer is an elastomer having some or all of the following characteristics, in any combination, where ranges from any recited upper limit to any recited lower limit are contemplated:
(a) the diene is 5-ethylidene-2-norbornene or 5-vinyl-2-norbornene;
(b) the diene-derived units are present in an amount of about 1 to about 3%, or about 0.5 to about 1.5%, based on the combined weight of units derived from propylene, diene, and ethylene; and
(c) the elastomer has a Mooney viscosity ML(1+4) at 125° C. of from 0.5 to 100, or from 5 to 40.

In another embodiment, the propylene-alpha-olefin copolymer is a crosslinked elastomer comprising (a) propylene-derived units and (b) at least 0.1% of units derived from one or more additional components selected from the group consisting of ethylene, $C_4$-$C_{20}$ alpha-olefins, and diene, based on the total weight of components (a) and (b). The crosslinked elastomer has isotactic polypropylene crystallinity, a melting point by DSC equal to or less than about 110° C., and a heat of fusion of about 5 J/g to about 50 J/g. The crosslinked elastomer is crosslinked to a degree so as to provide at least about 2%, at least about 10%, at least about 20%, or about 2% to about 95% by weight, crosslinked insolubles, or it is crosslinked to a degree so as to provide the elastomer with a viscosity ratio of from about 1 or about 1.2 to about 10.

In various embodiments, features of the crosslinked elastomer include some or all of the following characteristics, in any combination, where ranges from any recited upper limit to any recited lower limit are contemplated:
(a) the propylene-derived units are present in an amount of at least about 80%, based on the total weight of components (a) and (b);
(b) the elastomer has a tension set after 200% elongation of less than about 50% and an ultimate tensile strength of at least about 1000 psi (6.89 MPa);
(c) component (b) of the crosslinked elastomer comprises diene-derived units in an amount of about 0.1 to about 5%, or about 0.5 to about 1.5%, or about 1 to about 3%, based on the total weight of components (a) and (b); and
(d) component (b) of the crosslinked elastomer comprises units derived from 5-vinyl-2-norbornene or 5-ethylidene-2-norbornene.

The propylene-alpha-olefin copolymer may comprise copolymers prepared according to the procedures described in WO 02/36651, U.S. Pat. No. 6,992,158, and/or WO 00/01745, the contents of which are incorporated herein by reference. Preferred methods for producing the propylene-alpha-olefin copolymer may be found in U.S. Pat. Nos. 7,232,871 and 6,881,800, the contents of which are incorporated herein by reference.

The invention is not limited by any particular polymerization method for preparing the propylene-alpha-olefin copolymer, and the polymerization processes described herein are not limited by any particular type of reaction vessel.

The propylene-alpha-olefin copolymer can be polymerized by a single stage, steady state polymerization conducted in a well-mixed continuous feed polymerization reactor. The polymerization can be conducted in solution, although other polymerization procedures, such as gas phase or slurry polymerization, are also contemplated. The process can be described as a continuous, non-batch process that, in its steady state operation, is exemplified by removal of amounts of polymer made per unit time, being substantially equal to the amount of polymer withdrawn from the reaction vessel per unit time. As used herein, "substantially equal" means that these amounts, polymer made per unit time, and polymer withdrawn per unit time, are in ratios of one to other, of from about 0.9:1; about 0.95:1; about 0.97:1; or about 1:1. The polymerization is accomplished in a single step or in a single reactor, although multiple reactors may also be used.

In one embodiment, the propylene-alpha-olefin copolymer is prepared by a process which includes the following steps: a) feeding solvent and monomers, including propylene and optionally one or more of ethylene, $C_{4-20}$ alpha-olefins, and non-conjugated diene, in predetermined proportions to a polymerization reactor; b) adding a soluble catalyst to the reactor; and c) polymerizing the monomers in solution to produce an effluent containing a polymer. In order to remove polar compounds that act as catalyst poisons, the solvent and monomer feeds can be purified over mole sieves, alumina beds, or other absorbents as known in the art. The reactor temperature can be controlled by methods well known in the art such as autorefrigeration, prechilled feeds (adiabatic reactors), cooling coils, and combinations of these techniques. The pressure should be sufficient to keep the reactor contents in solution at the reactor temperature. Polymerization is carried out at temperatures in the range of from about –20° C. to about 200° C. The residence time per reactor is maintained at from 1 to 180 minutes. The polymer concentration in the effluent of the reactors is maintained in the range of about 1 to about 20% by weight. The overall polymerization rate is set by the catalyst and monomer feed rates. Polymer composition is controlled by adjusting the monomer feed rate to a reactor. Polymer molecular weight is set by choosing the reactor temperature, monomer concentration, and by optionally adding chain transfer agents, such as hydrogen. The polymer product can be conventionally recovered from the effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure.

In one embodiment, a catalyst system used to produce the propylene-alpha-olefin copolymer and includes one or more transition metal compounds and one or more activators. When alumoxane or aluminum alkyl activators are used, the combined pre-catalyst-to-activator molar ratio is from about 1:5000 to about 10:1. When ionizing activators are used, the combined pre-catalyst-to-activator molar ratio is from about 10:1 to about 1:10. Multiple activators may be used, including using mixtures of alumoxanes or aluminum alkyls with ionizing activators.

In another embodiment, the catalyst system includes a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, the contents of which are incorporated herein by reference.

In another embodiment, the propylene-alpha-olefin copolymer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the propylene-alpha-olefin copolymer contains greater than about 0.2 parts per million, greater than about 0.5 parts per million, greater than about 1 part per million, or greater than about 5 parts per million of the residues of the activating cocatalyst.

In another embodiment, the propylene-alpha-olefin copolymer is produced using a single-sited polymerization catalyst, which allows only a single statistical mode of addition of the first and second monomer sequences. In a particular aspect of this embodiment, the reactor is a continuous flow stirred tank polymerization reactor which allows only a single polymerization environment for substantially all of the polymer chains of the polymer.

One or more reactors in series or in parallel may be used in the present invention. The catalyst component and activator may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added either to the first reactor in the series or to both reactors with one component being added to first reaction and another component to the other reactors.

For further general process condition information, see U.S. Pat. No. 5,001,205, and PCT publications WO 96/33227 and WO 97/22639, the contents of which are incorporated herein by reference. For further information on gas phase polymerization processes, see U.S. Pat. Nos. 4,543,399, 4,588,790, 5,028,670, 5,317,036, 5,352,749, 5,405,922, 5,436,304, 5,453,471, 5,462,999, 5,616,661, 5,627,242, 5,665,818, 5,668,228, and 5,677,375, and European publications EP-A-0 794 200, EP-A-0 802 202 and EP-B-634 421, the contents of which are incorporated herein by reference. For information on how to introduce a liquid catalyst system into a fluidized bed polymerization into a particle lean zone, see U.S. Pat. No. 5,693,727, the contents of which are incorporated herein by reference. For further information on slurry polymerization processes, see U.S. Pat. Nos. 3,248,179 and 4,613,484, the contents of which are incorporated herein by reference. PCT publication WO 96/08520 and U.S. Pat. No. 5,712,352, the contents of which are incorporated herein by reference, describe a polymerization process which is operated in the absence of or essentially free of any scavengers, although the use of scavengers is contemplated.

In one or more embodiments, the compositions of this invention may contain a sufficient amount of the polyolefin to form polyolefin compositions useful herein.

Thus, in one or more embodiments, the polyolefin compositions can include at least about 25 wt. %, in other embodiments at least about 40 wt. %, in other embodiments at least about 50 wt. %, and in other embodiments at least about 80 wt. % of polyolefin (i.e., propylene-alpha olefin copolymers), based upon the total weight of the polyolefin composition. In these or other embodiments, the amount of polyolefin within the composition can be from about 25 to about 75 wt. %, in other embodiments from about 40 to about 80 wt. %, and in other embodiments from about 45 to about 75 wt. %, based on the total weight of the polyolefin composition.

Flame Retardants

In embodiments herein, a flame retardant is used to accord flame resistance to the polyolefin composition. Any suitable flame retardant may be used. In some embodiments, the flame retardant comprises at least one of a halogenated hydrocarbon and a metal oxide. In one or more embodiments, a three-part flame retardant filler package is employed. This three-part system includes a halogenated organic flame retardant, a metal oxide, and a non-halogenated flame retardant. In one or more embodiments, the non-halogenated flame retardant is a char-forming flame retardant, which may also be referred to as an intumescent material.

Halogenated Organic Flame Retardant

Types of halogenated organic flame retardants include halogenated hydrocarbons such as chlorinated and/or brominated phenyl-containing compounds. Examples of chlorine-containing flame retardants include chlorinated paraffins, chlorinated polyolefins, and perchlorocyclopentadecane. Examples of bromine-containing flame retardants include hexabromobenzene, n-ethylene-bisdibromonorbornane-dicarboxylmide, ethylene-bistetrabromophthalimide, tetrabromobisphenol-A derivatives, tetrabromobisphenol S, tetrabromodipentaerythritol, brominated cyclopentadiene, and decabromodiphenylethane. In particular embodiments, the halogenated organic compound is a brominated organic compound, preferably decabromodiphenylethane.

In one or more embodiments, the amount of halogenated flame retardant (e.g. halogenated hydrocarbon) within the polyolefin composition may be quantified based upon the entire weight of the composition. In one or more embodiments, the polyolefin composition includes at least 2.0 wt. %, in other embodiments at least 2.5 wt. %, and in other embodiments at least 3.0 wt. % halogenated organic compound, based upon the entire weight of the composition. In these or other embodiments, the polyolefin compositions may include from about 2.0 to about 7.0 wt. %, about 2.0 to about 6.5 wt. %, or in other embodiments from about 3.0 to about 6.0 wt. % halogenated organic compound based upon the entire weight of the composition.

Metal Oxide/Synergist

In one or more embodiments, the metal oxides include those metal oxides that act synergistically with the halogenated organic compound. In other embodiments, antimony oxide sols, iron oxides, and salts of Sb(v) esters may be employed. A particularly preferred metal oxide is antimony trioxide.

In one or more embodiments, the amount of metal oxide within the polyolefin composition may be quantified based upon the entire weight of the composition. In one or more embodiments, the polyolefin composition includes at least 4.0 wt. %, in other embodiments at least 5.0 wt. %, and in other embodiments at least 6.0 wt. % metal oxide based upon the entire weight of the composition. In these or other embodiments, the polyolefin compositions may include from about 4.0 to about 13.0, or in other embodiments from about 6.0 to about 12.0 wt. % metal oxide based upon the entire weight of the composition.

Intumescent/Char Forming Materials

In one or more embodiments, intumescent materials include those materials that expand and form a char layer as a barrier between the underlying material and surrounding environment; this char layer is hard to burn, and insulates and protects the underlining material from burning. It is believed that intumescents operate by expansion either as a result of a chemical reaction under heat, or as by a primarily physical reaction that occurs due to the configuration of components in the intumescent material. Examples of intumescent or char forming materials include zinc borate hydrate, magnesium hydroxide, aluminum trihydrate, ammonium polyphosphate, melamine polyphosphate, starch (e.g., corn starch) or other carbohydrates that form heavy char when exposed to fire, and polyhydric alcohols such as trihydroxy alcohols and tetrahydroxy alcohols.

In one or more embodiments, the amount of intumescent material within the composition may be quantified based upon the entire weight of the composition. In one or more embodiments, the polyolefin composition includes at least 8.0 wt. %, in other embodiments at least 10.0 wt. %, and in other embodiments at least 15.0 wt. % intumescent material, based upon the entire weight of the composition. In these or other embodiments, the polyolefin compositions may include from about 8.0 wt. % to about 25.0 wt. %, or in other embodiments from about 12.0 wt. % to about 20.0 wt. % intumescent material, based upon the entire weight of the composition.

In particular embodiments, a combination of decabromodiphenylethane, antimony trioxide, and zinc borate hydrate is employed.

In one or more embodiments, it has unexpectedly been discovered that a synergistic balance of the three flame retardants provides advantageous results. In these embodiments, the advantageous results are achieved when the total flame retardant loading, which may be represented by the sum of the halogenated compound (x), the metal oxide (y), and the char-forming material (z) is at least 25 wt. %, in other embodiments at least 28 wt. %, and in other embodiments at least 30 wt. %; in these or other embodiments the sum of x, y, and z is less than 40 wt. %, in other embodiments less than 38 wt. %, and in other embodiments less than 35 wt. %. In these embodiments, the amount of halogenated compound x (e.g., decabromodiphenylethane) is from about 2.0 to about 7.0 wt. %, and in other embodiments from about 3.0 to about 6.0 wt. %; the amount of the metal oxide y (e.g., antimony trioxide) is from about 2× to about 5× (i.e., twice to five times the amount of the halogenated compound), or in other embodiments from about 3× to about 4×; and the amount of the char-forming compound (e.g., zinc borate hydrate) is from about 8.0 to about 25.0 wt. %, in other embodiments from about 10.0 to about 20.0 wt. %, or in other embodiments from about 12.0 to about 18.0 wt. %, with the foregoing weight percentages being based upon the total weight of the composition.

UV Protectants

In embodiments herein, a UV protectant is used to accord UV resistance to the polyolefin composition. Any suitable UV protectant may be used.

In preferred embodiments, the UV protectant is carbon black. In one or more embodiments, useful carbon black may be characterized based upon its particle size, which may be quantified according to ASTM D-3849. In one or more embodiments, the carbon black may have a particle size of less than 65 nm, in other embodiments less than 45 nm, and in other embodiments less than 35 nm, in other embodiments less than 25, and in other embodiments less than 20 nm. In these or other embodiments, the carbon black may have a particle size of from about 12 to about 40 or in other embodiments from about 15 to about 30.

In one or more embodiments, useful carbon black may be characterized based upon its surface area, which may be quantified by BET nitrogen absorption. In one or more embodiments, the carbon black employed in practicing the present invention may have a surface area that is at least 75, in other embodiments at least 100, and in other embodiments at least 200 m$^2$/g. In these or other embodiments, the carbon black may have a surface area of from about 100 to about 300 or in other embodiments from about 150 to about 250 m$^2$/g.

In one or more embodiments, useful carbon black may be characterized based upon its iodine adsorption number, which may be quantified according to ASTM D-1510. In one or more embodiments, the carbon black employed in practicing the present invention may have an iodine absorption of at least 100, in other embodiments at least 120 and in other embodiments at least 130 mg/g. In these or other embodiments, the carbon black may have an iodine adsorption of less than 170, in other embodiments less than 160, and in other embodiments less than 150 mg/g.

In one or more embodiments, when the UV protectant is carbon black, the amount of carbon black used may be quantified based upon the entire weight of the composition. In one or more embodiments, the polyolefin composition includes at least 1.5 wt. %, in other embodiments at least 2.0 wt. %, and in other embodiments at least 3.0 wt. % carbon black based upon the entire weight of the composition. In these or other embodiments, the polyolefin compositions may include from about 2.0 to about 6.0 wt. %, or in other embodiments from about 2.0 to about 4.0 wt. % carbon black based upon the entire weight of the composition.

In one or more embodiments, the UV protectant is a non-carbon black protectant, such as hindered amine light stabilizers, benzotriazoles, and/or the like, and the amount of non-carbon black protectant used may be quantified based upon the entire weight of the composition. In one or more embodiments, the polyolefin composition includes at least 0.05 wt. %, in other embodiments at least 0.1 wt. %, and in other embodiments at least 0.25 wt. % UV protectant based upon the entire weight of the composition. In these or other embodiments, the polyolefin compositions may include from about 0.05 to about 0.5 wt. %, or in other embodiments from about 0.1 to about 0.5 wt. % UV protectant based upon the entire weight of the composition. A hindered amine light stabilizer useful herein is Tinuvin® 770 (BASF Chemicals North America, Florham Park, N.J.). A benzotriazole useful herein is Tinuvin® 328 (BASF Chemicals North America, Florham Park, N.J.).

In particular embodiments, the polyolefin compositions are devoid, essentially devoid, or substantially devoid of UV-inhibitors, UV-stabilizers, and antioxidants including, but not limited to, phenol-containing UV-inhibitors, UV-stabilizers, and antioxidants, as well as hindered amine light stabilizers other than carbon black. As used hinere, "substantially devoid" refers to the absence of that amount of additive (e.g., UV-inhibitor) that would have a deleterious impact on the polyolefin composition, its manufacture, or use. "Essentially devoid" refers that to absence of more than a de minimis amount of the additive. In one or more embodiments, the polyolefin compositions of the invention include less than 2 wt. %, in other embodiments less than 1 wt. %, in other embodiments less than 0.5 wt. %, in other embodiments less than 0.1 wt. %, and in other embodiments less than 0.05 wt. % of UV-inhibitors, UV-stabilizers, antioxidants, or hindered amine light stabilizers other than carbon black.

Other Constituents

In addition to the polyolefin, flame retardant, and UV protectant, the polyolefin compositions of the invention may optionally include one or more compatibilizers, calcined clay, kaolin clay, nanoclay, talc, silicates, carbonates, sulfates, additional carbon black, sand, glass beads, mineral aggregates, wollastonite, mica, glass fiber, other filler, pigments, colorants, dyes, dispersants, antioxidants, conductive particles, adhesion promoters, fatty acids, esters, paraffin waxes, neutralizers, metal deactivators, tackifiers, calcium stearate, desiccants, stabilizers, light stabilizers, light absorbers, coupling agents including silanes and titanates, plasticizers, lubricants, blocking agents, antiblocking agents, antistatic agents, waxes, foaming agents, nucleating agents, slip agents, acid scavengers, adjuvants, surfactants, crystallization aids, polymeric additives, defoamers, preservatives, thickeners, rheology modifiers, humectants, reinforcing and non-reinforcing fillers and combinations thereof and other processing aids known in the polyolefin compounding art.

These additives can comprise up to about 50 wt. % of the total composition. Preferably, additives comprise about 0 to 45 wt. %.

Compounding

The polyolefin composition of the present invention may be compounded using methods known in the art. Suitable mixing equipment includes Banbury™ mixers (Farrel Corp., Ansonia, Conn.) single screw and twin-screw rotary mixers, buss kneader, and Farrel Continuous Mixers™ (Farrel Corp.). In addition, the step of mixing may be integrated into a molding process. Such molding equipment may include injection molding equipment, compression molding equipment, and blow molding equipment.

Product Properties

In embodiments herein, the polyolefin compositions are flame resistant. In one or more embodiments, the polyolefin compositions of the present invention meet the flame resistance standards of UL94 with a rating of V2. In other embodiments, the polyolefin compositions of the present invention meet the flame resistance standards of UL94 with a rating of V1. In yet other embodiments, the polyolefins of the present invention meet the flame resistance standards of UL94 with a rating of V0.

Flame resistance is measured by UL94, a standard for the safety of the flammability of plastic materials for parts in devices and appliances (Underwriters Laboratories Inc., "Tests for Flammability of Plastic Materials for Parts in Devices and Appliances," Jun. 4, 2009). Specimens molded from the polyolefin composition are oriented in a vertical position and they are subjected to a defined flame ignition source for a specified period of time, depending on the specifications of the relevant test method. The three vertical ratings (V2, V1, and V0) indicate that the material was tested in a vertical position and self-extinguished within a specified time after the ignition source was removed. The vertical ratings also indicate whether the test specimen dripped flaming particles that ignited a cotton indicator located below the sample. These ratings determine the material's tendency either to extinguish or to spread the flame once the specimen has been ignited.

In one or more embodiments, the polyolefin compositions of the present invention are characterized by a Shore A hardness of at least 50.0, in other embodiments at least 60.0, in other embodiments at least 70.0, and in other embodiments at least 80.0. In these or other embodiments, the polyolefin compositions of the present invention are characterized by a Shore A hardness of less than 100.0, in other embodiments less than 90.0, and in other embodiments less than 85.0. In yet other embodiments, the polyolefin compositions of the present invention are characterized by a Shore A hardness in the range of 60.0 to 95.0, preferably 70.0 to 90.0, preferably 75.0 to 90.0, preferably 80.0 to 90.0. The Shore A hardness is determined according to an internal test method which meets and exceeds the requirements of ASTM D2240 and ISO 868. A Type A durometer and durometer stand with 1 kg load, equipped with an electronic digital readout is used. The durometer is mounted in the durometer stand, adjusted for height and levelness and checked for free movement. The durometer is then calibrated. The 1 kg weight is placed on the appropriate mounting post containing the Shore A durometer. The samples are injection molded plaques having a thickness of 2 mm that have been conditioned at room temperature for at least sixteen hours and equilibrated at 23±2° C. for a minimum of one hour before the test. Three samples are selected. One 50 mm diameter disk is cut from the center of each of the three samples. These three disks are stacked to form the test specimen disk having a thickness of 6 mm. The gauge is introduced to the specimen using an even, constant motion as quickly as possible without shock. The hardness value from the electronic readout is recorded 15 seconds after the bottom of the gauge is in firm contact with the specimen. The measurement procedure is repeated four more times on the same disk, ensuring that each measurement is taken at least 6 mm away from any other measurement and at least 13 mm away from the edge of the disk. The mean of the five values obtained is rounded to the nearest tenth of a whole number and reported as the Shore A hardness.

In one or more embodiments, the polyolefin compositions of the present invention are characterized by an ultimate tensile strength (tensile strength at failure) of at least 5.00 MPa, in other embodiments at least 6.00 MPa, in other embodiments at least 7.00 MPa, in other embodiments at least 8.00 Mpa, and in other embodiments at least 9.00 MPa. In these or other embodiments, the polyolefin compositions of the present invention are characterized by an ultimate tensile strength of less than 15.00 MPa, in other embodiments less than 12.00 MPa, and in other embodiments less than 11.00 MPa. Ultimate tensile strength is determined using ASTM D 412, with the following modifications.

An Instron® 4204 (Norwood, Mass.) instrument is used. The sample is cut perpendicular to the flow direction. The sample thickness is obtained from three measurements, one in the middle, and one at each end of the test length. The median value is used as the thickness of the specimen. The sample is conditioned at 23° C. for 16 hours. The die dimensions are 6+0.04 and −0.00 mm. The test result is reported as the median of three measurements to the nearest 0.05 MPa (10 psi).

In one or more embodiments, the polyolefin compositions of the present invention are characterized by a modulus at 100% elongation (tensile stress) of at least 2.00 MPa, in other embodiments at least 2.50 MPa, in other embodiments at least 2.85 MPa, in other embodiments at least 3.00 Mpa, and in other embodiments at least 3.15 MPa. In these or other embodiments, the polyolefin compositions of the present invention are characterized by a modulus at 100% elongation of less than 3.30 MPa, in other embodiments less than 3.20 MPa, and in other embodiments less than 3.15 MPa. Modulus at 100% elongation is determined using ASTM 412, modified as above.

In one or more embodiments, the polyolefin compositions of the present invention are characterized by an ultimate elongation of at least 600%, in other embodiments at least 650%, in other embodiments at least 700%, in other embodiments at least 750%, and in other embodiments at least 780%. In these or other embodiments, the polyolefin compositions of the present invention are characterized by an ultimate elongation of less than 1000%, in other embodiments less than 900%, and in other embodiments less than 800%. Ultimate elongation is determined using ASTM 412, modified as above, and is reported to the nearest 10%.

Industrial Applicability

Polyolefins of this invention are useful for making a variety of articles such as weather seals, hoses, belts, gaskets, moldings, boots, elastic fibers, and like articles. They are useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In one or more embodiments, the polyolefins of the present invention may be used in electrical applications, such as wire, cable, electrical connectors and devices that capture and convert solar energy.

In some embodiments, the invention relates to:

1. A flame-retardant composition comprising:
  (a) a copolymer comprising at least about 50 wt. % of propylene-derived units, and about 5-35 wt. % of units derived from at least one of ethylene or a $C_{4-10}$ alpha-olefin (preferably about 7 to about 32 wt. %, about 8 to about 25 wt. %, about 8 to about 20 wt. %, or about 8 to about 18 wt. %; preferably about 10-20 wt. % of ethylene-derived units);
  wherein the copolymer has a heat of fusion of about 75 J/g or less (preferably about 70 J/g or less, about 50 J/g or less, or about 35 J/g or less);
  (b) a flame retardant (preferably comprising at least one of:
  (i) a halogenated hydrocarbon (preferably the halogenated hydrocarbon is one of chlorinated paraffins, chlorinated polyolefins, perchlorocyclopentadecane, hexabromobenzene, n-ethylene-bisdibromonorbornane-dicarboxylmide, ethylene-bistetrabromophthalimide, tetrabromobisphenol-A derivatives, tetrabromobisphenol S, tetrabromodipentaerythritol, brominated cyclopentadiene, and decabromodiphenylethane; preferably the halogenated hydrocarbon is a brominated hydrocarbon; preferably the brominated hydrocarbon is decabromodiphenylethane);
  (ii) a metal oxide (preferably the metal oxide is one of antimony trioxide, antimony oxide sols and salts of Sb(v) esters); preferably the metal oxide is antimony oxide); and
  (iii) optionally a char forming material (preferably zinc borate hydrate, magnesium hydroxide, aluminum trihydrate, ammonium polyphosphate, melamine polyphosphate, starch or other carbohydrates, and polyhydric alcohols; preferably zinc borate hydrate);
  (preferably the flame retardant comprises decabromodiphenylethane, antimony trioxide, and zinc borate); and
  (c) optionally, a UV protectant (preferably the UV protectant is carbon black, preferably the composition is substantially devoid of UV stabilizer and antioxidants other than carbon black; preferably in an amount of at least 1.5 wt. %, in other embodiments at least 2.0 wt. %, and in other embodiments at least 3.0 wt. % UV protectant based upon the entire weight of the composition);
  wherein the composition satisfies the requirements of UL94 with a V2 rating (preferably with a V1 rating, preferably with a V0 rating).

2. The composition of paragraph 1, wherein the flame retardant comprises a halogenated hydrocarbon present in an amount of about 2.0-7.0 wt. % of the composition.

3. The composition of paragraphs 1 and 2, wherein the flame retardant comprises a halogenated hydrocarbon and a metal oxide, and the metal oxide is present in amount of about 2-5 times the amount of the halogenated compound.

4. The composition of paragraphs 1 to 3, wherein the flame retardant is present in an amount of about 25-35 wt. % of the composition.

5. The composition of paragraphs 1 to 4, wherein the flame retardant comprises a char forming material present in an amount of about 8.0-25 wt. % of the composition.

6. The composition of paragraphs 1 to 5, wherein the copolymer has one or more of:
  (i) a melting point of about 100° C. or less (preferably about 90° C. or less, about 80° C. or less, or about 70° C. or less);
  (ii) a crystallinity of about 2% to about 65% of isotactic polypropylene (preferably about 0.5 to about 40%, about 1 to about 30%, or about 5 to about 35%);
  (iii) a triad tacticity of three propylene units, as measured by $^{13}C$ NMR, of at least about 75% (at least about 80%, at least about 82%, at least about 85%, or at least about 90%); and
  (iv) a Melt Flow Rate of from about 1-10 dg/min.

7. The composition of paragraphs 1 to 6, further comprising about 1-10 wt. % polypropylene.

8. The composition of paragraphs 1 to 7, wherein the composition has at least one of:
  (i) a Shore A hardness in the range of from about 60.0-95.0 (preferably 70.0 to 90.0, preferably 75.0 to 90.0, preferably 80.0 to 90.0);
  (ii) an Ultimate Tensile Strength of at least 5.00 MPa (preferably at least 6.00 MPa, at least 7.00 MPa, at least 8.00 Mpa, or at least 9.00 MPa);
  (iii) an Ultimate Elongation at least 600% (preferably at least 650%, at least 700%, at least 750%, or at least 780%); and
  (iv) a modulus at 100% elongation of at least 2.00 MPa (preferably at least 2.50 MPa, at least 2.85 MPa, at least 3.00 Mpa, or at least 3.15 MPa).

9. A flame-retardant composition of paragraphs 1 to 8 comprising:
 (a) at least about 40 wt. % (or at least about 50 wt. %, or about 50-60 wt. %, or about 50-55 wt. %) of a copolymer, wherein the copolymer comprises at least about 50 wt. % of propylene-derived units, and about 5-35 wt. % of ethylene-derived units, and has a heat of fusion of about 75 J/g or less, a melting point of about 100° C. or less, a crystallinity of about 2% to about 65% of isotactic polypropylene, and a Melt Flow Rate of about 1-10 dg/min (ASTM 1238, 230° C./2.16 kg);
 (b) about 20-40 wt. % (or at about 20-35 wt. %, or about 25-30 wt. %) of a flame retardant,
 wherein the flame-retardant composition satisfies the requirements of UL94, with a V0 rating, and has:
 (a) a Shore A hardness of about 60.0-90.0;
 (b) an Ultimate Tensile Strength of at least about 5 mPa; and
 (c) an Ultimate Elongation of at least about 600%.
10. A flame-retardant composition of paragraphs 1 to 9 comprising:
 (a) about 50-55 wt. %, by weight of the composition, of a copolymer comprising at least about 50 wt. % of propylene-derived units, and about 10-20 wt. % of ethylene-derived units, wherein the copolymer has a heat of fusion of about 75 J/g or less, a melting point of about 100° C. or less, a crystallinity of about 2% to about 65% of isotactic polypropylene, and a Melt Flow Rate of about 1-10 dg/min (ASTM 1238, 230° C./2.16 kg);
 (b) about 25-30 wt. %, by weight of the composition, of decabromodiphenylethane, antimony trioxide, and polypropylene in relative weight proportions of 60:20:20, respectively;
 (c) about 10-15 wt. % of zinc borate by weight of the composition;
 (c) about 5.0-6.0 wt. % of carbon black by weight of the composition,
 wherein the flame-retardant composition satisfies the requirements of UL94, with a V0 rating, and has at least one of:
 (a) a Shore A hardness of about 60.0-90.0;
 (b) an Ultimate Tensile Strength of at least about 5 mPa; and
 (c) an Ultimate Elongation of at least about 600%.
11. A method of making the composition of paragraphs 1 to 11 comprising combining:
 (a) a copolymer comprising at least about 50 wt. % of propylene-derived units, and about 5-35 wt. % of units derived from at least one of ethylene or a $C_{4-10}$ alpha-olefin, wherein the copolymer has a heat of fusion of about 75 J/g or less;
 (b) a flame retardant; and
 (c) optionally a UV protectant, and
forming a flame-retardant composition that satisfies the requirements of UL94, with a V2 rating.

In order to demonstrate the practice of the present invention, the following examples have been prepared and tested. The examples should not, however, be viewed as limiting the scope of the invention. The claims will serve to define the invention.

EXAMPLES

Specific gravity was determined according to TPE-0105/1, which is similar to ASTM D-792. Flame testing was determined according to UL 94 vertical burning test.

Polyolefin compositions were prepared by compounding the polymers listed below with a flame retardant package and a UV protectant. The polymers used in the Examples are as described below in Table 1.

TABLE 1

Polymers Used In Examples

| Polymer | Source | Description |
|---|---|---|
| F008F | Sunoco Chemicals (now Braskem, Sao Paulo, Brazil) | Propylene homopolymer; MFR = 0.8 g/10 min |
| Santoprene ™ 111-45 | ExxonMobil Chemicals (Houston, Texas) | Thermoplastic vulcanizate (TPV); Density = 0.960 g/cm³ |
| Vistamaxx ™ 6102 | ExxonMobil Chemicals (Houston, Texas) | Propylene-based elastomer; 16 wt. % ethylene comonomer; MFR = 3.0 g/10 min; density = 0.862 g/cm³ |
| Exact ™ 9061 | ExxonMobil Chemicals (Houston, Texas) | Ethylene-butene copolymer; MI = 0.5 g/10 min; density = 0.862 g/cm³ |
| Vistalon ™ 722 | ExxonMobil Chemicals (Houston, Texas) | Copolymer rubber; 72 wt. % ethylene; MI = 1.0 g/10 min |

Portions of the polymers above were mixed with the other ingredients as provided in Table 2. The amounts of the various ingredients that were compounded are provided in percent by weight, based upon the total weight of the composition.

The flame retardant package consisted of a Br/Sb masterbatch and zinc borate hydrate. The Br/Sb masterbatch was a blend of decabromodiphenylethane, antimony trioxide, and polypropylene (60:20:20 by weight) obtained under the tradename FR 6287 (PMC Polymer Products Inc., Stockertown, Pa.) and the char-forming flame retardant was zinc borate hydrate obtained under the tradename Firebrake ZB (Rio Tinto PLC, London, UK).

The UV protectant was a commercial blend carbon black concentrate including 40% carbon black and polypropylene, which was obtained under the tradename Ampacet™ 49974 (Ampacet North America, DeRidder La.).

TABLE 2

Polymer Compositions I to IV

| Polymer | Composition I (Comparative) wt. % | Composition II (Inventive) wt. % | Composition III (Comparative) wt. % | Composition IV (Comparative) wt. % |
|---|---|---|---|---|
| F008F | 1.00 | — | — | — |
| Santoprene ™ 111-45 | 52.00 | — | — | — |
| Vistamaxx ™ 6102 | — | 53.00 | — | — |
| Exact ™ 9061 | — | — | 53.00 | — |
| Vistalon ™ 722 | — | — | — | 53.00 |
| FR 6287 | 29.50 | 29.50 | 29.50 | 29.50 |
| Ampacet ™ 49974 | 7.50 | 7.50 | 7.50 | 7.50 |
| Firebrake ZB | 10.00 | 10.00 | 10.00 | 10.00 |
| Total: | 100.00 | 100.00 | 100.00 | 100.00 |

The polyolefin samples were then fabricated into appropriate test specimens in order to conduct the following testing, the results of which are set forth in Table 3.

TABLE 3

Composition Testing

| Test (Units) | Composition I (Comparative) wt. % | Composition II (Inventive) wt. % | Composition III (Comparative) wt. % | Composition IV (Comparative) wt. % |
| --- | --- | --- | --- | --- |
| Shore Hardness A | 82.9 | 80.1 | 79.5 | 80.1 |
| Specific Gravity | 1.278 | 1.182 | 1.188 | 1.193 |
| Ultimate Tensile Strength (MPa) | 4.07 | 10.98 | 4.10 | 2.57 |
| Modulus at 100% elongation (MPa) | 3.12 | 3.18 | 3.21 | — |
| Ultimate Elongation (%) | 228 | 792 | 580 | 50 |
| UL 94 Vertical Burn test | V1 passed | V0 passed | — | — |

Various modifications and alterations that do not depart from the scope and spirit of this invention will become apparent to those skilled in the art. This invention is not to be duly limited to the illustrative embodiments set forth herein.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A flame-retardant composition comprising:
    (a) a copolymer comprising at least about 50 wt. % of propylene-derived units, and about 5-35 wt. % of units derived from at least one of ethylene or a $C_{4\text{-}10}$ alpha-olefin, wherein the copolymer has a heat of fusion of about 75 J/g or less; and
    (b) 25-35 wt % of a flame retardant, wherein the flame retardant comprises a halogenated hydrocarbon, a metal oxide, and a char-forming material and wherein the metal oxide is present in an amount of about 2-5 times the amount of the halogenated compound by weight,
    wherein the halogenated hydrocarbon is present in an amount of about 2.0-7.0 wt. % of the composition;
    wherein the composition satisfies the requirements of UL94 with a V2 rating; and
    wherein the composition has a Shore A hardness in the range of from about 60.0-95.0, an Ultimate Tensile Strength of at least about 5 mPa, and an Ultimate Elongation of at least about 600%.

2. The composition of claim 1, wherein the halogenated hydrocarbon is a brominated hydrocarbon.

3. The composition of claim 1, wherein the halogenated hydrocarbon is decabromodiphenylethane.

4. The composition of claim 1, wherein the metal oxide is antimony trioxide.

5. The composition of claim 1, wherein the char-forming material is zinc borate.

6. The composition of claim 1, wherein the char-forming material is present in an amount of about 8-25 wt. % of the composition.

7. The composition of claim 1, further comprising carbon black.

8. The composition of claim 1, wherein the copolymer has at least one of:
    (a) a melting point of about 100° C. or less;
    (b) a crystallinity of about 2% to about 65% of isotactic polypropylene;
    (c) a triad tacticity of three propylene units, as measured by $^{13}C$ NMR, of at least about 75%; and
    (d) a Melt Flow Rate of from about 1-10 dg/min (ASTM 1238, 230° C./2.16 kg).

9. The composition of claim 1, wherein the copolymer comprises about 10-20 wt. % of ethylene-derived units.

10. The composition of claim 1, further comprising about 1-10 wt. % polypropylene.

11. The composition of claim 1, wherein the composition includes less than 2 wt. % of UV stabilizer and antioxidants other than carbon black.

12. A method for making a flame-retardant composition, comprising combining:
    (a) a copolymer comprising at least about 50 wt. % of propylene-derived units, and about 5-35 wt. % of units derived from at least one of ethylene or a $C_{4\text{-}10}$ alpha-olefin, wherein the copolymer has a heat of fusion of about 75 J/g or less;
    (b) 25-35 wt % of a flame retardant, wherein the flame retardant comprises a halogenated hydrocarbon, a metal oxide, and a char-forming material and wherein the metal oxide is present in an amount of about 2-5 times the amount of the halogenated compound by weight; and
    forming a flame-retardant composition that satisfies the requirements of UL94, with a V2 rating;
    wherein the halogenated hydrocarbon is present in an amount of about 2.0-7.0 wt. % of the composition; and
    wherein the composition has a Shore A hardness in the range of from about 60.0-95.0, an Ultimate Tensile Strength of at least about 5 mPa, and an Ultimate Elongation of at least about 600%.

13. The method of claim 12, wherein the flame retardant comprises decabromodiphenylethane, antimony trioxide, and zinc borate.

14. The method of claim 12, wherein the copolymer has at least one of:
    (a) a triad tacticity of three propylene units, as measured by $^{13}C$ NMR, of at least about 75%;
    (b) a Melt Flow Rate of from about 1-10 dg/min;
    (c) a melting point of about 100° C. or less; and
    (d) a crystallinity of about 2% to about 65% of isotactic polypropylene.

15. The composition of claim 1, wherein the copolymer comprises 0.1 to 5 wt % of diene-derived units.

16. A flame-retardant composition comprising:
    (a) 25-80 wt. %, by weight of the composition, of a copolymer comprising at least about 50 wt. % of propylene-derived units and about 7-32 wt. % of ethylene-derived units, wherein the copolymer has a heat of fusion of about 75 J/g or less; and
    (b) a flame retardant that consists essentially of
        (i) a halogenated hydrocarbon selected from chlorinated paraffins, chlorinated polyolefins, perchlorocyclopentadecane, hexabromobenzene, n-ethylene-bisdibromonorbornane-dicarboxyimide, ethylene-bistetrabromophthalimide, tetrabromobisphenol-A derivatives, tetrabromobisphenol S, tetrabromodipentaerythritol, brominated cyclopentadiene, or decabromodiphenylethane;
        (ii) a metal oxide; and
        (iii) a char-forming material selected from zinc borate hydrate, magnesium hydroxide, aluminum trihydrate, ammonium polyphosphate, melamine polyphosphate, starch, and polyhydric alcohols;

where the flame retardant is present in an amount such that the composition comprises 2.0-7.0 wt. % halogenated hydrocarbon, 4.0-13.0 wt. % metal oxide, and 8.0-25.0 wt. % char-forming material, by weight of the composition, and where the metal oxide is present in an amount of about 2-5 times the amount of the halogenated compound; and (c) 1.5-6.0 wt %, by weight of the composition, of a UV protectant;

wherein the composition satisfies the requirements of UL94 with a V2 rating; and wherein the composition has a Shore A hardness in the range of from about 60.0-95.0, an Ultimate Tensile Strength of at least about 5 mPa, and an Ultimate Elongation of at least about 600%.

17. The flame-retardant composition of claim 16, wherein the copolymer further comprises 0.1 to 5 wt % of diene-derived units.

* * * * *